UNITED STATES PATENT OFFICE 2,083,962

PROCESS FOR THE MANUFACTURE OF AMINO AND NITRO DERIVATIVES

Pierre Petitcolas, Rouen, France, assignor to Compagnie Nationale de Matieres Colorantes et Manufactures de Produits Chimiques du Nord Reunies, Etablissements Kuhlmann, Paris, France, a corporation of France No Drawing. Application March 19, 1937, Serial No. 131,933. In France March 5, 1936

2 Claims. (Cl. 260—124)

In the French Patent No. 720,559 of the 24th July, 1931, there has been described a process for the preparation of azodyestuffs consisting inter alia in coupling with arylides of β-hydroxy-naphthoic acid diazo compounds of aromatic amines of formula:

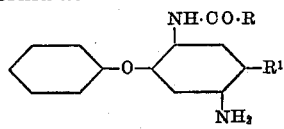

in which $R^1$ represents a halogen atom and R any group. The amines in question may be obtained by reduction of nitro compounds of the formula:

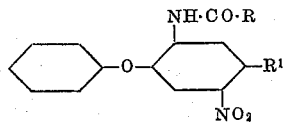

Now it has been found, according to the present invention, that the above nitro and halogen compounds may readily be condensed with salts of phenolic compounds giving products of the general formula:

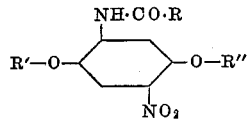

in which R has the same significance as above, and R' and R'' indicate substituted or unsubstituted aryl groups. These products themselves give by subsequent reduction aromatic amines of the formula:

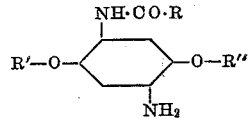

which are capable of being diazotized and coupled in substance or on the vegetable fibre with coupling compounds of substantive character, giving in particular a range of dyeings from Bordeaux to violet, whose properties of fastness and brightness are improved over those of the dyeings described in French Patent No. 720,559 mentioned above.

The nitro and halogen compounds of formula:

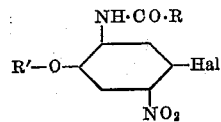

may be readily obtained by acylation of the bases derived from ortho-amino-diphenyloxide, having in para-position to the oxygen link a halogen atom in the aryl group carrying the amino group, and then by nitration of the acyl amino compounds thus obtained. This nitration may advantageously be effected by means of concentrated nitric acid, either alone or with the addition of a solvent, such as chloro-benzene, acetic acid, etc.

The condensation of these products with the phenolic compounds is preferably effected by employing them in the form of their alkali salts and operating in the presence of an excess of phenolic compound in the free state. The reduction of the condensation products may take place according to the usual processes.

The possibility of employing certain of the amines obtained according to the process of the invention has already been mentioned. This is the case in particular for those in which R' in the formula represents the residue of an at least partially hydrogenated cyclic hydrocarbon. However, such amines have not yet been described and no convenient process has yet been proposed for their preparation.

The following are non-limiting examples illustrating the carrying of the invention into effect:—

Example 1

2-amino-4-chloro-diphenylether is benzoylated in the usual conditions and 150 grams of the benzoylated compound obtained (M. P. 83° C.) is dissolved in 300 ccs. of glacial acetic acid at 60° C. Into this solution is gradually introduced 120 grams of nitric acid of 48° Bé. The mixture is heated for 2 hours at 70° C. and poured upon ice. The nitro compound thus produced is filtered, washed in water and then recrystallized from alcohol. It melts at 139° C. and has the form of small pale yellow crystals; it is constituted by 2-benzoylamino-4-chloro-5-nitro-diphenylether.

On the other hand, 17 grams of pure caustic potash are dissolved in 150 grams of phenol at about 100–120° C. The temperature is gently raised to 185° C. in order to remove all the water formed in the reaction. After cooling to 150° C. 92 grams of 2-benzoylamino-4-chloro-5-nitro-diphenylether are added gradually and the whole is heated for 8 hours at 150° C. The mass is poured into water, rendered alkaline with caustic soda to eliminate the excess phenol and, after filtration of the crystallized condensation product, it is purified with acetic acid. This product has the form of yellow crystals (M. P. 201–202° C.).

By reduction by one of the usual processes, the diphenylether of 2-benzoylamino-5-amino-hydroquinone, of melting point 121° C. is isolated.

The diazonium salt of this product may be isolated in the following manner:—

40 grams of diphenylether of 2-benzoylamino-5-aminohydroquinone are pasted for a few hours in 100 ccs. of concentrated hydrochloric acid of 21° Bé. to which has been added 10 ccs. of water. 10 grams of dry sodium nitrite are gradually added while agitating energetically. After 2 hours of agitation the diazonium chloride is filtered, which has the form of fine yellow crystals. The crystals are pressed and dried by admixture with dehydrated aluminium sulphate. The product may be employed for example by a simple solution in water for the production of azo dyes.

Example 2

150 grams of para-cresol have added thereto 18 grams of pure potash. The mixture is heated to 190–195° C. to eliminate the water formed in the reaction, and then is allowed to cool to about 150° C. 92 grams of 2-benzoylamino-4-chloro-5-nitro-diphenylether, prepared as in Example 1, is introduced. The whole is heated for 5 hours to 170–180° C. The mass is poured into alkaline water. The condensation product which has crystallized gradually is purified with acetic acid (M. P. 182° C.).

By reduction according to the usual processes the 2-amino-3-(4'-methyl)-phenoxy-5-benzoylamino-6-phenoxy-benzene of formula:

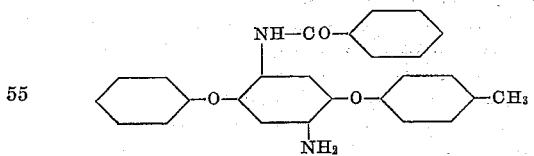

and the point of fusion of which, after recrystallization from alcohol, is 119° C.

Example 3

A mixture of 150 grams of ortho-cresol and 12.5 grams of caustic potash is heated at 180–190° C. so as to distill off the water formed in the reaction.

After cooling to 120° 80 grams of 2'-chloro-2-benzoylamino-4-chloro-5-nitro-diphenylether is added and the whole is heated to 140° for an hour. The product is poured into water rendered alkaline with caustic soda and is recrystallized from alcohol. A nitro compound of M. P. 193–194° is obtained. The product is reduced with iron and acetic acid in the usual manner and the iron sludge is extracted with boiling ethyl alcohol. The base isolated melts at 67–68°; it has the formula:

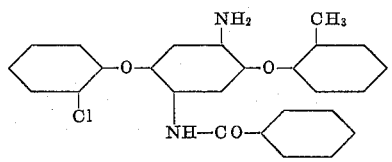

Example 4

In the same way there can be obtained:

(1) 2-benzoylamino-4-ortho-tolyloxy-5-nitro-diphenylether of melting point 175–176° which, when reduced, gives the base:

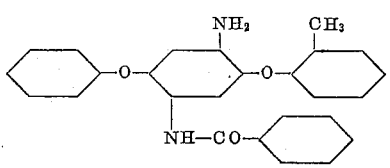

of melting point 88–89°.

(2) 2'-chloro-2-benzoylamino-4-phenoxy-5-nitro-diphenylether of melting point 176° which, by reduction, gives the base:

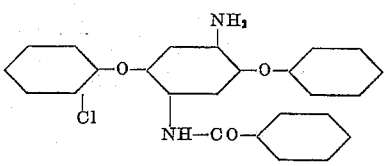

of melting point 122–123°.

(3) 2-benzoylamino-4-ortho-chloro-phenoxy-5-nitro-diphenylether of melting point 178–179° which, when reduced, gives the base:

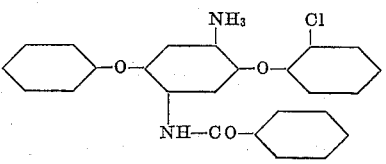

of melting point 95–96°.

(4) 2'-chloro-2-benzoylamino-4-ortho-chloro-phenoxy-5-nitro-diphenylether, of melting point 188–189° which, when reduced, gives the base:

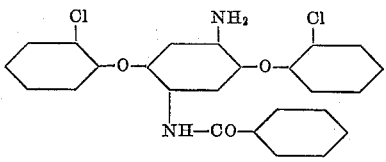

of melting point 122–123°.

Example 5

2 grams of the α-naphthylamide of 2.3-hydroxynaphthoic acid are pasted with 2.5 ccs. of denatured alcohol and 1.4 ccs. of caustic soda of 34° Bé. It is diluted with 3 ccs. of cold water and a clear solution is obtained to which is added 1 cc. of formaldehyde of 33% strength.

After remaining for 5 minutes this solution is poured into a litre of cold water to which has been previously added 2.8 ccs. of caustic soda of 34° Bé. and 5 ccs. of 50% sodium sulphoricinate.

50 grams of cotton thread are treated for half an hour at 25-30° C. in this impregnating bath and are then wrung out and developed immediately in a developing bath containing 2.5 grams of the diazo derivative of the produt of Example 1 and 40 grams of sodium chloride in 1 litre of water.

The duration of the development is half an hour in the cold. Then the skein of cotton is rinsed, acidified, and again rinsed and soaked for half an hour at the boil in a bath containing 5 grams of Marseilles soap per litre and then again rinsed and dried.

A violet-reddish shade is obtained.

The following table gives the shades of dyes obtained by coupling the diazo derivatives of the bases described with different coupling components of substantive character:—

| Diazo compound | Coupling compound | Shade |
| --- | --- | --- |
| 2-benzoylamino-4-o-tolyloxy-5-amino-diphenylether | Diacetoacetyl-o-toluidine | Yellow. |
| Do | Anilide of 2.3-hydroxy-naphthoic acid | Bordeaux-corinth. |
| Do | m-Nitranilide of 2,3-hydroxy-naphthoic acid | Bordeaux. |
| Do | β-Naphthylamide of 2,3-hydroxy-naphthoic acid | do. |
| Do | 5-Chloro-o-toluidide of 2,3-hydroxy-naphthoic acid | Bordeaux-corinth. |
| Do | p-Anisidide | Bordeaux. |
| Do | o-Toluidide | do. |
| Do | α-Naphthylamide | Corinth. |
| Do | o-Anisidide | Bordeaux. |
| Do | p-Chloro-o-anisidide | Bordeaux-corinth. |
| Do | β-Hydroxynaphthoyl-1-amino-3-chloro-4,6-dimethoxybenzene | do. |
| 2'-chloro-2-benzoylamino-4-phenoxy-5-amino-diphenylether | Diacetoacetyl-o-toluidine | Yellow. |
| Do | Anilide of 2.3-hydroxy-naphthoic acid | Corinth. |
| Do | m-Nitranilide of 2,3-hydroxy-naphthoic acid | Violet. |
| Do | β-Naphthylamide of 2,3-hydroxy-naphthoic acid | Corinth. |
| Do | 5-Chloro-o-toluidide of 2,3-hydroxy-naphthoic acid | do. |
| Do | p-Anisidide | Violet-corinth. |
| Do | o-Toluidide | Corinth. |
| Do | α-Naphthylamide | Violet. |
| Do | o-Anisidide | Bordeaux-corinth. |
| Do | p-Chloro-o-anisidide | do. |
| Do | β-Hydroxynaphthoyl-1-amino-3-chloro-4,6-dimethoxybenzene. | do. |
| 2-benzoylamino-4-o-chloro-phenoxy-5-amino-diphenylether | Diacetoacetyl-o-toluidine | Yellow. |
| Do | Anilide of 2,3-hydroxy-naphthoic acid | Bordeaux. |
| Do | m-Nitranilide of 2,3-hydroxy-naphthoic acid | Reddish-brown. |
| Do | β-Naphthylamide of 2,3-hydroxy-naphthoic acid | Bordeaux. |
| Do | 5-Chloro-o-toluidide of 2,3-hydroxy-naphthoic acid | do. |
| Do | p-Anisidide | do. |
| Do | o-Toluidide | do. |
| Do | α-Naphthylamide | Bordeaux-corinth. |
| Do | o-Anisidide | Bordeaux. |
| Do | p-Chloro-o-anisidide | do. |
| Do | β-Hydroxynaphthylamino-3-chloro-4,6-dimethoxy-benzene. | do. |
| 2'-chloro-2-benzoylamino-4-o-chloro-phenoxy-5-amino-diphenylether. | Diacetoacetyl-o-toluidine | Yellow. |
| Do | Anilide of 2,3-hydroxynaphthoic acid | Bordeaux. |
| Do | m-Nitranilide of 2,3-hydroxy-naphthoic acid | Corinth. |
| Do | β-Naphthylamide of 2,3-hydroxy-naphthoic acid | Bordeaux. |
| Do | 5-Chloro-o-toluidide of 2,3-hydroxy-naphthoic acid | do. |
| Do | p-Anisidide | do. |
| Do | o-Toluidide | do. |
| Do | α-Naphthylamide | Bordeaux-corinth. |
| Do | o-Anisidide | Bordeaux. |
| Do | p-Chloro-o-anisidide | do. |
| Do | β-Hydroxynaphthoyl-amino-3-chloro-4,6-dimethoxy-benzene. | do. |
| 2-benzoylamino-4-p-tolyloxy-5-amino-diphenylether | Diacetoacetyl-o-toluidine | Yellow. |
| Do | Anilide of 2,3-hydroxynaphthoic acid | Corinth. |
| Do | m-Nitranilide of 2,3-hydroxy-naphthoic acid | Violet. |
| Do | β-Naphthylamide of 2,3-hydroxy-naphthoic acid | Corinth. |
| Do | 5-Chloro-o-toluidide of 2,3-hydroxy-naphthoic acid | Bordeaux-corinth. |
| Do | p-Anisidide | do. |
| Do | o-Toluidide | do. |
| Do | α-Naphthylamide | Corinth. |
| Do | o-Anisidide | Bordeaux. |
| Do | p-Chloro-o-anisidide | do. |
| Do | β-Hydroxynaphthoylamino-3-chloro-4,6-dimethoxy-benzene. | Bordeaux-corinth. |
| 2'-chloro-2-benzoylamino-4-o-tolyloxy-5-amino-diphenylether. | Diacetoacetyl-o-toluidine | Yellow. |
| Do | Anilide of 2,3-hydroxynaphthoic acid | Bordeaux-corinth. |
| Do | m-Nitranilide of 2,3-hydroxy-naphthoic acid | Corinth. |
| Do | β-Naphthylamide of 2,3-hydroxy-naphthoic acid | Bordeaux-corinth. |
| Do | 5-Chloro-o-toluidide of 2,3-hydroxy-naphthoic acid | do. |
| Do | p-Anisidide | do. |
| Do | o-Toluidide | do. |
| Do | α-Naphthylamide | Corinth. |
| Do | o-Anisidide | Bordeaux-corinth. |
| Do | p-Chloro-o-anisidide | do. |
| Do | β-Hydroxynaphthoyl-1-amino-3-chloro-4,6-dimethoxy-benzene. | do. |

The shades thus obtained have a remarkable fastness to chlorine, boiling under pressure, to air and to light.

I claim:

1. A process for the manufacture of nitro compounds and amines comprising condensing a nitrated and halogenated product of the general formula

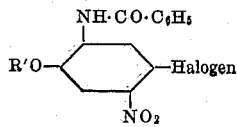

where R' represents an aryl radical taken from the group consisting of phenyl and chloro-phenyl, with an alkali metal salt of a compound taken from the group consisting of phenols, chlorophenols and cresols.

2. In a process for the manufacture of nitro compounds and amines the steps consisting in condensing a nitrated and halogenated product of the general formula

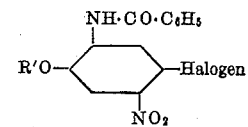

where R' represents an aryl radical taken from the group consisting of phenyl and chloro-phenyl, with an alkali metal salt of a compound taken from the group consisting of phenols, chlorophenols and cresols, and in reducing the condensation product obtained.

PIERRE PETITCOLAS.